United States Patent [19]

Kogawa

[11] Patent Number: 4,523,287
[45] Date of Patent: Jun. 11, 1985

[54] METHOD FOR EXTRAPOLATING A PATH OF A ROBOT AND APPARATUS THEREFOR

[75] Inventor: Takashi Kogawa, Sakura, Japan

[73] Assignee: Hitachi, Ltd., Tokyo, Japan

[21] Appl. No.: 360,846

[22] Filed: Mar. 22, 1982

[30] Foreign Application Priority Data

Mar. 20, 1981 [JP] Japan .................................. 56-39436

[51] Int. Cl.³ .............................................. G05B 19/46
[52] U.S. Cl. ..................................... 364/513; 364/169;
364/170; 364/723; 364/474; 318/573;
219/124.4
[58] Field of Search ............... 364/513, 474, 169, 170,
364/191, 192, 193, 723, 853; 318/573;
219/124.34, 124.4

[56] References Cited

U.S. PATENT DOCUMENTS

| | | | |
|---|---|---|---|
| 3,119,930 | 1/1984 | Isabeau | 364/853 |
| 3,246,130 | 4/1966 | Rubin | 364/723 |
| 3,617,716 | 11/1971 | Schulz | 364/723 |
| 4,042,161 | 8/1977 | Ando | 228/103 |
| 4,166,543 | 9/1979 | Dahlstrom | 318/603 |
| 4,205,217 | 5/1980 | Araya et al. | 318/657 |
| 4,216,945 | 11/1980 | Kreig | 219/124.33 |
| 4,258,425 | 3/1981 | Ramsey et al. | 364/513 |
| 4,348,731 | 9/1982 | Kogawa | 364/513 |
| 4,362,977 | 12/1982 | Evans et al. | 364/513 |
| 4,387,327 | 6/1983 | Kralowetz et al. | 318/573 |
| 4,402,053 | 8/1983 | Kelly et al. | 364/513 |
| 4,409,650 | 10/1983 | Noguchi | 219/124.34 |
| 4,412,121 | 10/1983 | Kremers et al. | 219/124.34 |

Primary Examiner—Jerry Smith
Assistant Examiner—John P. Lastova
Attorney, Agent, or Firm—Antonelli, Terry & Wands

[57] ABSTRACT

A method of and apparatus for controlling the path of an industrial robot, in which a slight change in the shape of the work or the position of the work relatively to the robot, if any, can be detected by a position detection arrangement capable of detecting the work position, and a previously given data concerning the path of the robot is corrected in accordance with the result of the detection by the position detection arrangement, so that the range of work conducted by robot, such as welding, sealing and so forth, is broadened advantageously.

10 Claims, 6 Drawing Figures

4,523,287

METHOD FOR EXTRAPOLATING A PATH OF A ROBOT AND APPARATUS THEREFOR

BACKGROUND OF THE INVENTION

1. FIELD OF THE INVENTION

The present invention relates to a method of and apparatus for controlling the path of a robot having a position detecting means for detecting the position of a work.

2. DESCRIPTION OF THE PRIOR ART

In the field of industrial robots for performing tasks such as welding, sealing or the like, there has been proposed to provide a position detecting means on the robot so that the robot can detect any change in the shape of the work or the position of the work relatively to the robot and perform the task automatically and correctly while correcting the content of the instruction in accordance with the result of the detection.

FIG. 1 shows a conventional system for achieving a task such as welding or sealing by means of a robot. Namely, a plate $W_2$ having a hook-shaped plan is placed on a horizontal plate $W_1$, and welding or application of an adhesive is achieved by a robot along the inner juncture line between the plates $W_1$ and $W_2$, i.e. along the lines between points a and b, b and c, c and d.

Points $P_1$ to $P_6$ are determined as positions for making the detection of the work by means of the position detection means. The detection of the working positions is made by moving the detection means by the robot in the direction of arrows $f_1$ to $f_{17}$. The position detection means detects the plate $W_2$ when it is moved in the direction of arrows $f_1$, $f_4$, $f_7$, $f_{10}$, $f_{12}$ and $f_{16}$ and upon receipt of a predetermined signal, moved back along the arrows $f_2$, $f_5$, $f_6$, $f_{11}$, $f_{14}$ and $f_{17}$. Therefore, the points $P_1$ to $P_6$ of detecting operation have to be determined to fall, even when the positions of the plates $W_1$ and $W_2$ are fluctuated relatively to the robot, within the range of straight lines between points a and b, b and c and c and d. The points $P_1$ and $P_6$ of the position detecting operation have to be determined such that the plate $W_2$ can be detected without fail when the position detection means is moved in the directions of arrows $f_1$ and $f_{16}$. Therefore, at the points $P_1$ and $P_6$, the detecting operation is inevitably made for points spaced away from the points a and b.

The points $P_1'$ to $P_6'$ on the work corresponding to respective points $P_1$ to $P_6$ are determined by a calculation from the output of a posture detection means of the robot when the position detection means provides a specific signal. The points b and c are determined by calculating the points of intersection between the line interconnecting points $P_2'$ and $P_4'$ and the line interconnecting points $P_1'$ and $P_2'$ or the line interconnecting points $P_3'$ and $P_6'$.

Therefore, the welding or sealing between the point $P_1'$ and point b, point b and point c, and point c and point $P_6'$ can be achieved by moving the robot while making a linear interpolation of the object of the path control.

Conventionally, however, it has not been possible to effect an automatic work such as welding, sealing or the like in the region between point a and point $P_1'$ and the region between point $P_6'$ and point d. In these regions, therefore, the work had to be accomplished by a manual work which is quite troublesome and time consuming.

SUMMARY OF THE INVENTION

Accordingly, an object of the invention is to provide a method of and apparatus for controlling the path of robot which can broaden the region of the work as compared with the prior art.

To this end, according to the invention, work detecting points are set at a plurality of positions and the detection of position of the work is made at each of the detecting point. The position detecting means is made to operate to determine the detection point to which the path control object portion of the robot is to be brought.

In addition, assuming a line interconnecting a selected detection point and a point adjacent to the selected detection point, an arithmetic operation point is determined by an arithmetic operation at a position which is on the extension of the assumed line adjacent to the selected detection point and spaced from the latter by a designated distance. The path control object portion is controlled to interconnect the arithmetic operation point and the detection point.

Alternatively, the position detection means is moved along the above-mentioned extension of the assumed line and a changing point at which the output of the position detection means is changed abruptly is detected, and the path control object portion is controlled to interconnect the detected point of abrupt output change and the detection point.

The determination of the point of abrupt output change may be made after the detection of all detection points or immediately after the detection of all detection points or immediately after the finding out of the selected point and the adjacent point.

The detection of the point of abrupt output change may be made by obtaining the differential value of the signal from the position detection means and determining the point where the differential value exceeds a predetermined level as the point of abrupt output change. Alternatively, the output of the position detection means is compared with a predetermined reference value and the point at which the output is changed across the reference value is determined as the point of abrupt output change.

The position detection means may be of the type having a sensor adapted to detect the work position upon direct contact with the latter or may be of the type in which the work position is detected in a non-contacting manner as in U.S. Pat. No. 4,205,217 (Takeshi Araya).

The detecting operation and the correction of instructed data are achieved by a method which is made known by U.S. Pat. No. 4,042,161 (Shimon Ando).

DESCRIPTION OF THE PREFERRED EMBODIMENTS

Preferred embodiments of the invention will be described hereinunder as to a case where the task or work is accomplished for two works $W_1$ and $W_2$ with reference to FIG. 2.

After setting the work detection points $P_1$ to $P_6$, the position detection means is moved by the robot along the arrows $f_1$ to $f_{17}$ and the work detecting operation is made at each of the detecting operation points $P_1$ to $P_6$. The position detection means is made to operate at each detecting operation to determine the points which are to be passed by the path control object portion of the robot or the points where the same is to be stopped i.e. the future detection points $P_1'$ to $P_6'$. The point $P_1'$ is extracted as a selected point out of these detection points $P_1'$ to $P_2'$. A line is assumed to interconnect the selected point $P_1'$ and an adjacent point $P_2'$. An arithmetic operation point $P_0'$, an extrapolated point, is determined by an arithmetic operation at a position on the extension of the line adjacent to the selected point $P_1'$ and spaced from the latter by a predetermined distance $l_1$.

Similarly, the point $P_6'$ is selected as the selected point and an arithmetic operation point $P_7'$, an extrapolated point, is determined on the extension of the line interconnecting the selected point $P_6'$ and the adjacent point $P_5'$ at a distance of $l_2$ from the selected point $P_6'$.

The path control object portion e.g., a robot manipulator, is controlled in such a manner as to connect the arithmetic operation points $P_0'$, $P_7'$ and the detection points $P_1'$ to $P_6'$ to pass successively the points $P_0'$, $P_1'$, $P_2'$, b, $P_3'$, $P_4'$, c, $P_5'$, $P_6'$ and $P_7'$ while making a linear interpolation.

Figure 3:
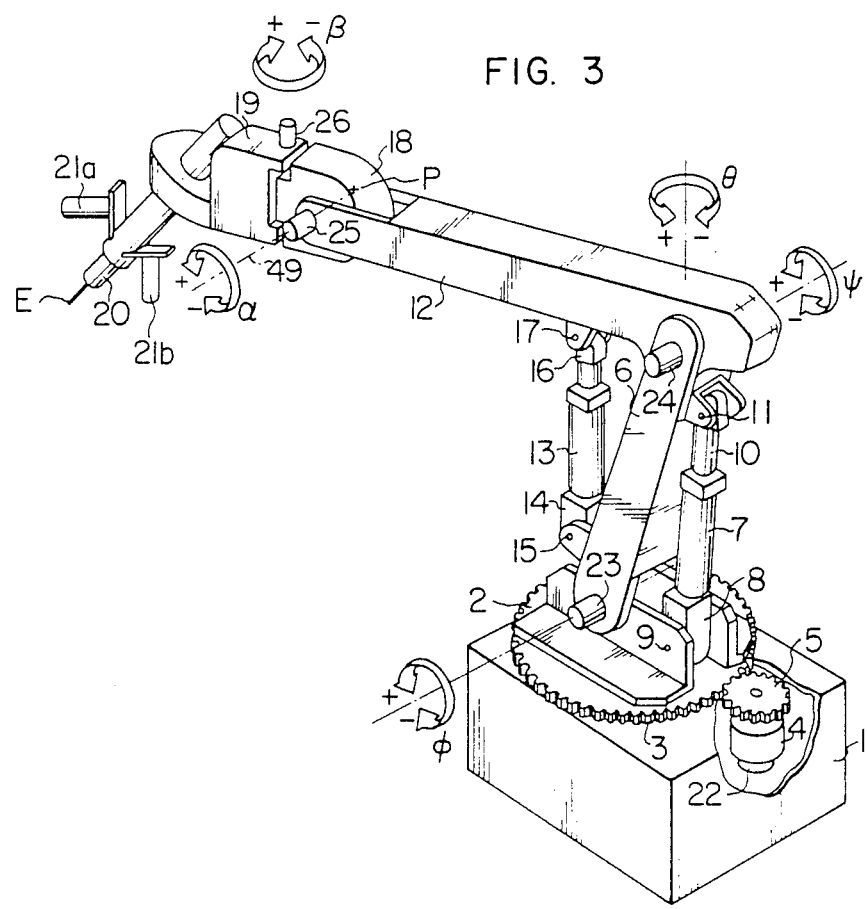
FIG. 3 is a perspective view of an example of the mechanical portion of a robot path controlling apparatus in accordance with the invention.
Figure 4:
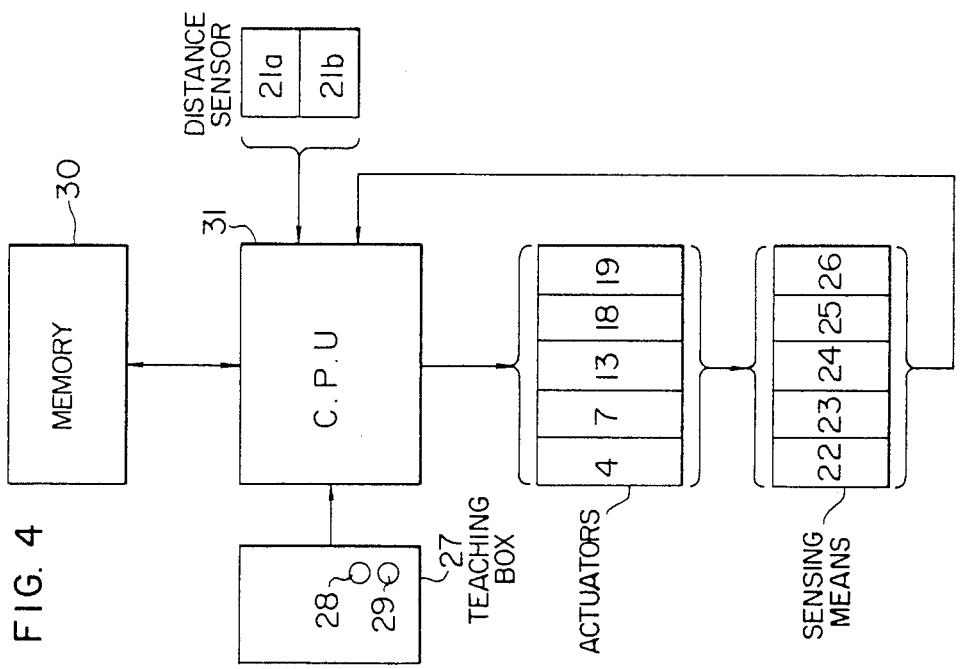
FIG. 4 is a block diagram showing an example of the control section of the robot path controlling apparatus of the invention.

This control can be achieved, for example, by the apparatus shown in FIGS. 3 and 4. FIG. 3 shows the mechanical portion of a robot. The robot has a base 1 and a rotary table 2 around which provided are teeth 3. A pinion gear 5 is directly connected to the shaft of an electric motor 4 mounted on the base 1. The pinion gear 5 meshes with a teeth 3 so that the rotary table 2 may be rotated around a vertical axis in the direction $\theta$ indicated by an arrow. A first arm 6 is pivotally secured to the rotatable table 2 by means of a pin which is not shown. A hydraulic actuator 7 has a head 8 which is pivotally connected to the rotary table 2 by means of a pin 9, and a rod 10 which is pivotally connected to the first arm 6 by means of a pin 11. The arrangement is such that the first arm 6 is rotated in the direction of an arrow $\phi$ by the hydraulic actuator 7. A second arm 12 is pivotally connected to the first arm 6 by means of a pin which is not shown.

The head 14 of an hydraulic actuator 13 is pivotally secured to the first arm 6 by means of a pin 15, while a rod 16 is pivotally connected to the second arm 12 by means of a pin 17. The actuator 13 causes a rotation of the second arm 12 in the direction of an arrow $\phi$.

The second arm 12 carries at its end a first oscillation motor 18 which has a horizontal axis of rotation and rotatable in the direction of an arrow $\alpha$. A second oscillation motor 19 is attached to the first oscillation motor 18. The second oscillation motor 19 has an oscillation shaft which is perpendicular to the oscillation shaft of the first oscillation motor 18, and is adapted to rotate in the direction of an arrow $\beta$.

A welding torch 20 and a pair of position detection means 21a, 21b are secured to the second oscillation motor 19. The arrangement is such that the detecting directions of the position detection means 21a and 21b are inclined at 45° to the direction of the welding torch 20 and that two position detection means forms an angle of 90° therebetween.

Posture detection means 22, 23, 24, 25 and 26 are adapted to detect, respectively, the posture of the rotary table 2 relatively to the base 1, posture of the first arm 6 relatively to the rotary table 2, posture of the second arm 12 relatively to the first arm 2, posture of the first oscillation motor 18 relatively to the second arm 12, and the posture of the second oscillation motor 19 relatively to the first oscillation motor 18.

The mechanism of the robot as explained hereinbefore in connection with FIG. 3 is not exclusive and the robot can have various other mechanical construction such as the construction disclosed in a preceding Japanese Patent Application No. 130821/1979. It is also possible to use a robot in which the whole part or a part of the movable portion moves linearly as in the case of the robot shown in Japanese Patent Laid-open No. 124357/1975.

FIG. 4 shows an example of the control section of the robot. A teaching box 27 has a first appointing means 28 adapted to appoint the selected point out of the detection points, and a second appointing means 29 adapted to instruct the position between the selected point and the arithmetic operation position.

The first appointing means 28 may be a mere push button or a digital switch. If a push button switch is used as the first appointing means, a judgement is made at the setting of each work detection point as to whether the point constitutes a selected point or not. If the point constitutes a selected point, the push button is pressed and then the next work detection position is set.

In the case where a digital switch or the like is used, it is possible to appoint the selected point after the completion of setting of all work detection points.

The second appointing means 29 may also be composed of a mere push button switch or a digital switch. In case that the distance between the selected point and the arithmetic operating position has to be made variable, it is preferred to use a digital switch.

In the case where the distance between the selected point and the arithmetic operation point is fixed, it is possible to integrate the first and second appointing means. A reference numeral 30 designates a memory means for memorizing work detection points, while a numeral 31 denotes an arithmetic operation means. The arithmetic operation means 31 is adapted to read out the content of the memory means 30 and to make the robbot perform the work detecting operation. At the same time, the arithmetic operation means 31 is adapted to detrmine the detection point to which the path control object of the robot, i.e. the end P of the welding torch 20, is to be brought, making use of the outputs from the posture detection means 22 to 26, when a predetermined output conditions of the detection means 21a and 22a are obtained.

The arithmetic operation means 31 is adapted to determine by a calculation the extrapolated arithmetic operation point. As stated before, this point is determined, assuming a line interconnecting the selected point appointed by the first appointing means 28 and an adjacent point, on the extensiion of the line adjacent to the selected point and spaced from the latter by a distance instructed by the second appointing means. Thus, the arithmetic operation means 31 operates to make the path control object of the robot move along the line between the arithmetic operation point and the detection point, by suitable controlling the electric motor 4, hydraulic actuators 7, 13, first oscillation motor 18 and the second oscillation motor 19.

The apparatus having the construction described heretofore operates in a manner explained hereinunder. Using the teaching box 27, an order is written in the memory means 30 such that the path control object P moves along the arrows $f_1$ to $f_{17}$ FIG. 2 and that the detection of work is made at each point of work detecting operation points $P_1$ to $P_6$. Also, the first appointing means 28 is operated to write in the memory means 30 that the detection points $P_1'$ and $P_6'$ detected by the detection operation made at the work detecting operation points $P_1$ and $P_6$ are the selected points. In addition, the second appointing means 29 is operated to write the distances $l_1$ and $l_2$ between the selected points and respective arithmetic operating points $P_0'$ and $P_7'$.

As the plates $W_1$ and $W_2$ are brought to the predetermined positions, the arithmetic operation means 31 reads out the informations concerning the work detecting operation from the memory means 30, and operates to move the path control object P along the arrow $f_1$ to $f_{17}$. At this time, the position detection means 21a opposes to the inner surface of the plate $W_2$, while the detection means 21b opposes to the surface of the plate $W_1$.

Then, as the output from the position detection means 21a, 21b take predetermined values at each work detecting operation point $P_1$ to $P_6$, the arithmetic operation means 31 reads the outputs from the posture detecting means $\theta n$, $\phi n$, $\psi n$, $\alpha n$ and $\beta n$. Using these values, the values Xn, Yn and Zn of the detection points $P_1'$ to $P_6'$ are determined in a rectangular coordinates in accordance with the following equation (1).

$$\begin{bmatrix} X_n \\ Y_n \\ Z_n \\ \alpha_n \\ \beta_n \end{bmatrix} = \begin{bmatrix} a_{11}a_{12}a_{13}a_{14}a_{15} \\ a_{21}a_{22}a_{23}a_{24}a_{25} \\ a_{31}a_{32}a_{33}a_{34}a_{35} \\ a_{41}a_{42}a_{43}a_{44}a_{45} \\ a_{51}a_{52}a_{53}a_{54}a_{55} \end{bmatrix} \begin{bmatrix} \theta_n \\ \phi_n \\ \psi_n \\ \alpha_n \\ \beta_n \end{bmatrix} \quad (1)$$

In the equation (1) above, the coefficients $a_{11}$ to $a_{55}$ are determined by the construction of the mechanical portion of the apparatus shown in FIG. 3.

The values $(X_1, Y_1, Z_1)$ to $(X_6, Y_6, Z_6)$ of the points $P_1$ to $P_6$ on the rectangular coordinates are thus determined. These values are written in the memory means 30.

The lines passing the points $P_n$ and $P_{n-1}$ can be given by the following equations (2) and (3)

$$Y = \left(\frac{Y_n - Y_{n-1}}{X_n - X_{n-1}}\right) X + \left(\frac{X_n Y_{n-1} - X_{n-1} Y_n}{X_n - X_{n-1}}\right) \quad (2)$$

$$Z = \left(\frac{Z_n - Z_{n-1}}{X_n - X_{n-1}}\right) X + \left(\frac{X_n Z_{n-1} - X_{n-1} Z_n}{X_n - X_{n-1}}\right) \quad (3)$$

From these equations, the equations of the lines between the detection points $P_1'$ and $P_2'$, between $P_3'$ and $P_4'$ and between $P_5'$ and $P_6'$ are determined by the operation of the arithmetic operation means 31. Then, the values (Xb, Yb, Zb) of the point b on the rectangular cordinates are determined by solving simultaneous equations, i.e. the equation of the line interconnecting the detection points $P_1'$ and $P_2'$ and the equation of the line interconnecting the detection points $P_3'$ and $P_4'$. Similarly, the values (Xc, Yc, Zc) of the point c on the rectangular coordinates are determined by solving the simultaneous equations, i.e. the equation of the line interconnecting the detection points $P_3'$ and $P_4'$ and the equation of the line interconnecting the detection points $P_5'$ and $P_6'$.

In some cases, there are differences between the values Xb, Xc obtained through simultaneous equations derived from the equation (2) and the values Xb, Xc obtained through simultaneous equations derived from the equation (3). These differences, however, are negligibly small and there is no problem in selectively using one of these values.

Figure 1:
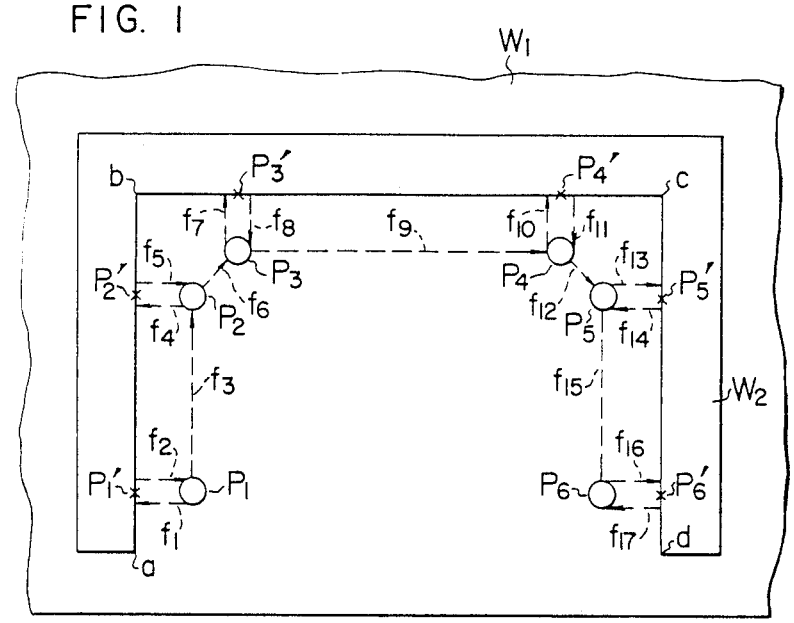
FIG. 1 is a chart for explaining the drawback of the conventional method of controlling the path of a robot.
Figure 2:
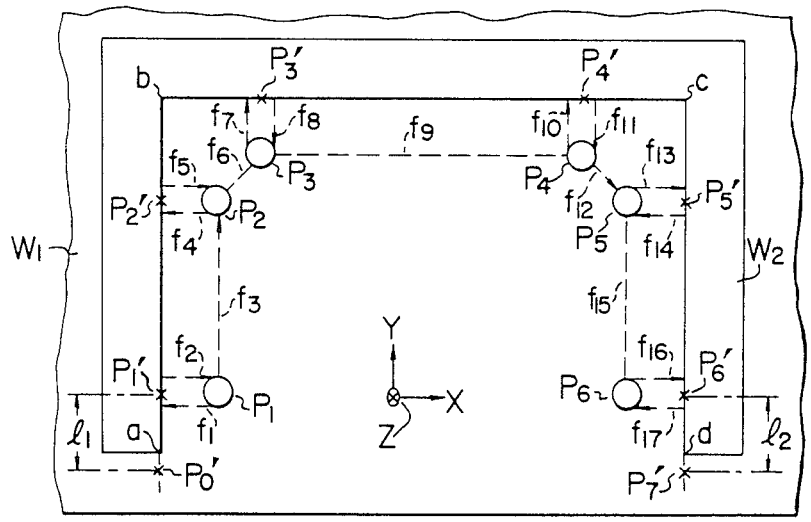
FIG. 2 is a chart for explaining a robot path controlling method in accordance with an embodiment of the invention.

In the case where the axes X, Y and Z of the coordinates are determined as shown by arrows in FIG. 2 while the plate $W_1$ is placed horizontally, the value of Z can be regarded as being constant. In this case, therefore, it is not necessary to effect the calculation of equation (3).

The values of detection points $P_1'$ to $P_6'$ and the points b and c on the rectangular coordinates are determined as described above. Then, the values of the arithmetic operation points $P_0'$ and $P_7'$ on the rectangular coordinates are determined in a manner explained hereinunder.

Generally, the coordinates values $(X_{n+1}, Y_{n+1})$ spaced by a distance l from a point $(X_n, Y_n)$ on a line $y = ax + b$ is expressed by the following equations.

$$X_{n+1} = X_n + l \cos \gamma \quad (4)$$

$$Y_{n+1} = Y_n + l \sin \gamma \quad (5)$$

where, $\gamma = \tan^{-1} a$

Similarly, the coordinates values $(X_{n+1}, Z_{n+1})$ of the point spaced by the distance from a point $(X_n, Y_n)$ on a line $z = a'x + b'$ are given as follows.

$$X_{n+1} = X_n + l \cos \sigma \quad (6)$$

$$Z_{n+1} = Z_n + l \sin \sigma \quad (7)$$

where, $\sigma = \tan^{-1} a'$

The coordinates values of the arithmetic operation points $P_0'$ and $P_7'$ are calculated by the arithmetic operation means 31 from the equations (4), (5), (7) or the equations (4), (6), (7).

The coordinates values of the arithmetic operation points $P_0'$, $P_7'$, as well as those of the detection points $P_1'$ to $P_6'$ and the points b and c are thus determined. Then, calculations are made by the arithmetic operation means 31 to make interpolation between adjacent points $P_0'-P_1'-P_2'-b$, $b-P_3'-P_4'-c$, $c-P_5'-P_6'-P_7'$, and the electric motor 7, hydraulic actuators 7, 13, first oscillation motor 18 and the second oscillation motor 19 are controlled in accordance with the calculation result.

As will be seen from the foregoing description, according to the invention, in the case where the position a portion of the work cannot be detected due to a fluctuation in the shape of the work or a deviation of the work position in relation to the robot, such a position is determined by a calculation and such a portion can be processed by a linear interpolation.

Accordingly, it is possible to broaden the range of work which can be conducted by the robot.

Figure 5:
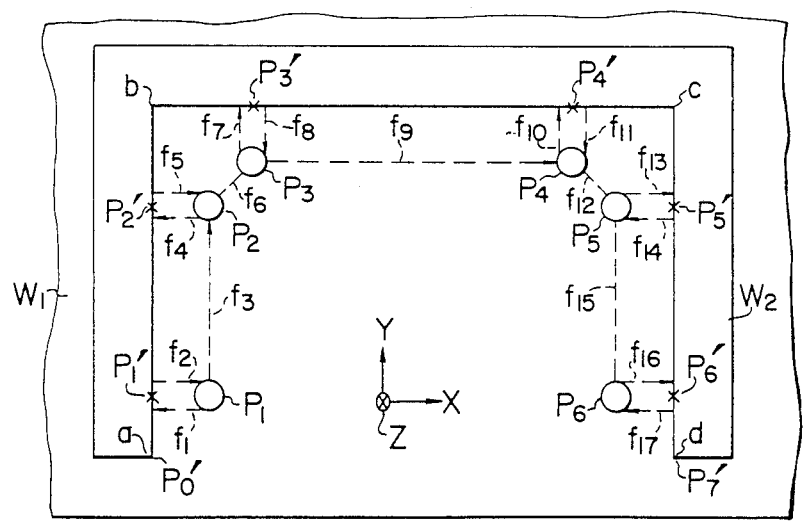
FIG. 5 is a chart for explaining a robot path controlling method in accordance with another embodiment of the invention.

Referring now to FIG. 5 showing another embodiment of the invention, after setting the work detecting operation positions $P_1$ to $P_6'$ the position detection means is moved by means of the robot along the arrows $f_1$ to $f_{17}$ and the position detecting operation is made at each of the points $P_1$ to $P_6$. At each time of the detecting operation, the position detection means is operated to determine the position which is to be passed by the path control object of the robot or the point at which the same is to be stopped, i.e. the future detection points, $P_1'$ to $P_6'$. Out of these detection points $P_1'$ to $P_6'$, the point $P_1'$ is picked up as the selected point. Then, the position detection means is moved on the extension of the line interconnecting the selected point $P_1'$ and the adjacent point $P_2'$ and a point $P_0'$ is detected as the point of an abrupt output change. Namely, the output of the position detection means is abruptly changed at the point $P_0'$ because the positional relationship between the position detection means and the work $W_2$ is abruptly changed at this position. Similarly, the point $P_6'$ is picked up as the selected point and the position detection means is moved along the extension of the line interconnecting the selected point $P_6'$ and the adjacent point $P_5'$, and a point $P_7'$ is detected as the point of abrupt output change. The path control object is controlled to interconnect the points $P_0'$, $P_7'$ of abrupt output change and the detection points $P_1'$ to $P_6'$, passing the points $P_0'$, $P_1'$, $P_2'$, b, $P_3'$, $P_4'$, c, $P_5'$, $P_6'$, $P_7'$ while making linear interpolation in each region between adjacent points.

Figure 6:
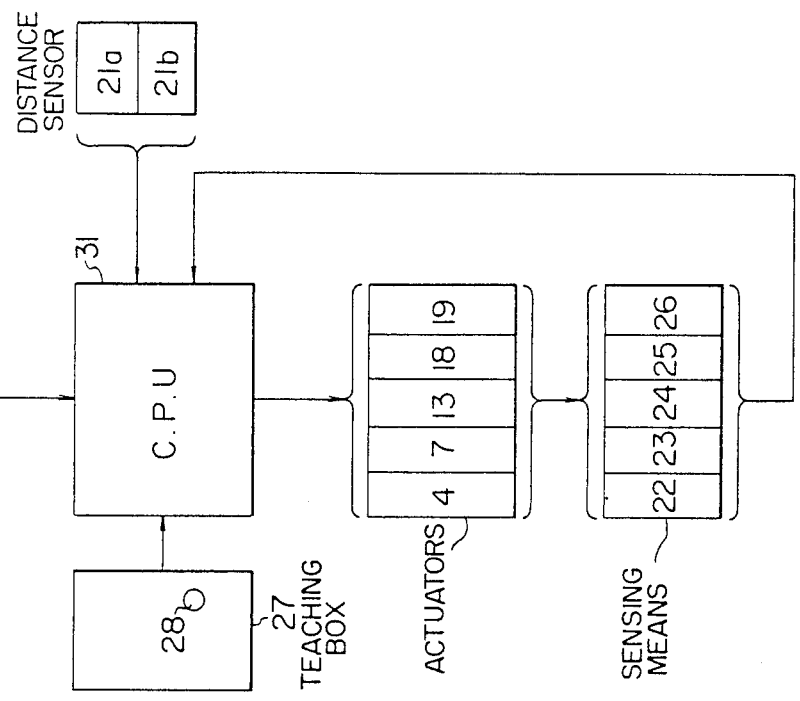
FIG. 6 is a block diagram of another example of the control section of the robot path controlling apparatus of the invention.

This controlling method can be performed, for example, by an apparatus as shown in FIGS. 3 to 6. FIG. 6 shows an example of the control section of such an apparatus. Namely, the control section has a teaching box 27 which includes a selected point appointing means adapted to appoint the selected point out of a plurality of detection points.

The selected point appointing means 28 may be a mere push button or may be a device like a digital switch. When a push button is used as the appointing means 28, at the time of setting of each detection point, a judgement is made as to whether the point constitutes a selected point and, if the point constitutes a selected point, the push button is pressed before the setting of the next work position detection point.

A reference numeral 30 designates a memory means adapted to memorize the work detection points, while a reference numeral 31 designates an operation controlling means.

The operation controlling means 31 is adapted to read out the content of the memory means 30 thereby to make the robot perform the work detecting operation. The operation controlling means 31 is further adapted to effect such a control as to make the path control object of the robot, i.e. the end P of the welding torch 20 seeks for the expected detection, when the point outputs from the detection means 21a and 21b take predetermined conditions at the time of detection of the work, from the outputs from the posture detection means 22 to 26.

The memory means 30 has such a commanding function as to actuate the operation controlling means 31 to operate the electric motor 4, hydraulic actuator 13, first oscillation motor 18 and the second oscillation motor 19, such that the path control object moves between the point of abrupt output change and the detection point, while moving the position detection means along the extension of the line interconnecting the selected point and the adjacent detection point to permit the position detection means finds the point of an abrupt change of the output thereof.

The apparatus having the construction explained hereinbefore operates in a manner explained hereinunder. Using the teaching box 27, an instruction is written in the memory means 30 such that the path control object moves along the arrows $f_1$ to $f_{17}$ and that the work detecting operation is performed at each of the work detecting operation points $P_1$ to $P_6$. At the same time, the selected point appointing means 28 is operated to write in the memory means 30 that the detection points $P_1'$ and $P_6'$ detected as a result of the detection operation at the work position detecting operation points $P_1$ and $P_6$ are the selected points.

Then, as the plates $W_1$ and $W_2$ are brought to the predetermined position, the operation controlling means 31 reads out the information concerning the work detection from the memory means 30 and drives the path control object P along the arrows $f_1$ to $f_{17}$. At this time, the position detection means 21 opposes to the inner wall surface of the plate $W_2$ while the detection means 21b opposes to the surface of the plate $W_1$.

At each of the work position detecting operation position $P_1$ to $P_6'$ as the outputs from the position detection means 21a and 21b take predetermined values, the operation controlling means reads the value of the outputs $\theta_n$, $\phi_n$, $\psi_n$, $\alpha_n$, $\beta_n$ from the posture detection means 22 to 26.

From these values, the values $X_n$, $Y_n$, $Z_n$ of the points $P_1'$ to $P_6'$ on the rectangular coordinates are determined in accordance with the foregoing equation (1).

Then the positions of the points b and c are determined in the same manner as that explained in connection with FIG. 2 using equations (2) and (3).

The operation controlling means 31 operates the position detection means 21a, 21b while activating the same, along the extension of line interconnecting the selected point $P_1'$ and the adjacent point $P_2'$ adjacent to the selected point $P_1'$, in accordance with the instruction given by the memory means 30. Then, as the position detection means 21a and 21b are moved to the points a, the outputs from these means are changed abruptly. The point $P_0'$ of abrupt output change is determined at this moment from the outputs of the posture detection means 22, 23, 24, 25 and 26.

Similarly, while activating the position detection means 21a, 21b, the operation controlling means 31 drives these means along the extension of the line interconnecting the selected point $P_6'$ and the adjacent point $P_5'$ adjacent to the selected point $P_6'$. Then, as the position detection means 21a, 21b reach the position d, the outputs from these detection means are changed abruptly. The point $P_7'$ of abrupt output change is determined at this moment from the outputs of the posture detection means 22, 23, 24, 25 and 26.

An arithmetic operation for the linear interpolation between the points $P_6'$ and $P_7'$ is achieved by the operation controlling means 31, and the electric motor 4, hydraulic actuators 7, 13, first oscillation motor 18 and the second oscillation motor 19 are controlled in accordance with the result of the arithmetic operation.

The selected point and the point adjacent to the selected point may be appointed by a device like a push button. However, if the work is simple as in the case of that shown in FIG. 5, it suffices only to write in the memory device that the first and the last points are the selected points. In the case of a work as shown in FIG. 5 in which the first and the last points constitute the selected points, each selected point has only one adjacent point, so that the memory means stores such an information that the second point from the beginning and the second point from the last constitute the adjacent points. Instead of moving the sensor along the extension of the line interconnecting the selected point and the adjacent point adjacent to the selected point, it is possible to move the sensor along an arcuate extension adjacent to the selected point of an arc inter connecting three points including the selected point, the point adjacent to the selected point and another point next to the adjacent point.

The memory means 30, operation controlling means 31 and other associated means incorporated in the apparatus of the invention can be substituted by a microcomputer.

What is claimed is:

1. A method of path control for a robot having means for detecting a boundary of a workpiece, said method comprising the steps of: setting a plurality of detecting points in proximity to the workpiece; detecting the locations of a plurality of boundary reference points on the workpiece boundary relative to respective ones of the detecting points; computing an extrapolated point arithmetically, which is disposed on an extension of a particular line extending through an adjacent pair of detected boundary reference points, the extrapolated point being spaced from the nearer one of the adjacent pair of detected boundary reference points by a predetermined length; and controlling a robot manipulator to pass along a path through the extrapolated point and the adjacent pair of detected boundary reference points.

2. A method according to claim 1, wherein two extrapolated points are determined and are located on opposite ends of the workpiece.

3. A method according to claim 1, wherein an intersection point of the extensions of two lines extending through two different adjacent pairs of detected boundary reference points is determined to be a corner of the workpiece, and controlling the robot manipulator to pass through the extrapolated point, one adjacent pair of detected boundary reference points, the corner of the workpiece and the second adjacent pair of detected boundary reference points.

4. A method of path control for a robot having means for detecting a boundary of a workpiece to be processed, said method comprising the steps of: setting a plurality of detecting points in proximity to the workpiece; detecting the locations of a plurality of boundary reference points on the workpiece boundary relative to respective ones of the detecting points; moving the detecting means along an extension of a particular line extending through an adjacent pair of the detected boundary reference points; detecting an extrapolated point along the extension of the particular line at which an output of the detecting means changes abruptly during the movement of the detecting means; and controlling a robot manipulator to pass along a path through the extrapolated point and the adjacent pair of detected boundary reference points.

5. A method according to claim 4, wherein an intersection point of the extensions of two lines extending through two different adjacent pairs of detected boundary reference points is determined to be a corner of the workpiece, and controlling the robot manipulator to pass through the extrapolated point, one adjacent pair of detected boundary reference points, the corner of the workpiece and the second adjacent pair of detected boundary reference points.

6. An apparatus for controlling a path of a robot comprising: means for operating a robot manipulator along a path; means for storing a plurality of detecting points in proximity to a workpiece; means for detecting the locations of a plurality of boundary reference points on the workpiece boundary relative to respective ones of the detecting points; means for computing an extrapolated point arithmetically, which is disposed on an extension of a particular line extending through an adjacent pair of detected boundary reference points, the extrapolated point being spaced from the nearer one of the adjacent pair of detected boundary reference points by a predetermined length, the operation means controlling the robot manipulator to pass along a path through the extrapolated point and the adjacent pair of detected boundary reference points.

7. An apparatus according to claim 6, wherein the means for storing a plurality of detecting points is a memory means, the computing means reading out data from the memory means and outputting commands to the operating means for enabling the detecting means to detect the boundary reference points.

8. An apparatus according to claim 6, wherein the computing means computes as a corner of the workpiece an intersection point of the extensions of two lines extending through two different adjacent pairs of detected boundary reference points, the operating means controlling the robot manipulator to pass through the extrapolated point, one adjacent pair of detected boundary reference points, the corner of the workpiece and the second adjacent pair of detected boundary reference points.

9. An apparatus for controlling a path of a robot comprising:

means for operating a robot manipulator along a path; memory means for storing a plurality of detection points in proximity to a workpiece; detecting means for detecting the locations of a plurality of boundary reference points on the workpiece boundary relative to respective ones of the detecting points; computing means for computing an extension of a particular line extending through an adjacent pair of the detected boundary reference points; the operating means enabling movement of the detecting means along the extension of the particular line for detecting an extrapolated point along the extension of the particular line at which an output of the detecting means changes abruptly during the movement of the detecting means; the operating means controlling the robot manipulator to pass along a path through the extrapolated point and the adjacent pair of detected boundary reference points.

10. An apparatus according to claim 9, wherein the computing means reads out data from the memory means for outputting commands to the operating means, the computing means computing as a corner of the workpiece an intersection point of the extensions of two lines extending through two different adjacent pairs of detected boundary reference points, the operating means controlling the robot manipulator to pass through the extrapolated point, one adjacent pair of detected boundary reference points, the corner of the workpiece and the second adjacent pair of detected boundary reference points.

* * * * *